United States Patent
Wesson et al.

(10) Patent No.: US 10,331,410 B2
(45) Date of Patent: Jun. 25, 2019

(54) HARDENED RANDOM NUMBER GENERATOR WITH RING OSCILLATOR COLLAPSE TIME RANDOM TRUNCATION

(71) Applicant: Google Inc., Mountain View, CA (US)

(72) Inventors: William Wesson, Mountain View, CA (US); Scott Johnson, Mountain View, CA (US); Karthika Periyathambi, Mountain View, CA (US); Lynn Bos, Mountain View, CA (US)

(73) Assignee: Google LLC, Mountain View, CA (US)

( * ) Notice: Subject to any disclaimer, the term of this patent is extended or adjusted under 35 U.S.C. 154(b) by 138 days.

(21) Appl. No.: 15/347,593

(22) Filed: Nov. 9, 2016

(65) Prior Publication Data

US 2018/0129476 A1    May 10, 2018

(51) Int. Cl.
*G06F 7/58* (2006.01)
*G06F 21/55* (2013.01)

(52) U.S. Cl.
CPC .............. *G06F 7/588* (2013.01); *G06F 7/582* (2013.01); *G06F 21/554* (2013.01); *G06F 2207/7219* (2013.01)

(58) Field of Classification Search
CPC ................................. G06F 7/588; G06F 7/582
USPC ......................................................... 708/251
See application file for complete search history.

(56) References Cited

U.S. PATENT DOCUMENTS 5,214,423 A    5/1993   Antoniou
6,065,029 A  * 5/2000   Weiss ...................... G06F 7/584
                                                          708/251
7,028,059 B2   4/2006   Williams
7,233,965 B2   6/2007   Rarick
7,315,874 B2   1/2008   Hars
7,424,500 B2   9/2008   Fukushima et al.
(Continued)

FOREIGN PATENT DOCUMENTS

TW           201523436         6/2015

OTHER PUBLICATIONS

V. Telandro, et al., A bi-channel voltage regulator protecting smart cards against power analysis attacks, Analog Integr. Circ. Sig. Process. (2009), p. 275-285. (Year: 2009).*

(Continued)

*Primary Examiner* — Keith E Vicary
*Assistant Examiner* — Emily E Larocque
(74) *Attorney, Agent, or Firm* — Colby Nipper PLLC

(57) ABSTRACT

A true random number generator (TRNG) uses an analog circuit with a ring oscillator configured to collapse from an unstable oscillation state to a stable oscillation state at a random collapse time and counter counting a counter value representing the random collapse time. Various techniques are used to harden the TRNG including a truncator generating a true random number based on a truncation of the reference count value and a dedicated voltage regulator supplying power to the analog core including the ring oscillator. Techniques also include various solutions for drawing a constant current such as using a Gray code counter and adding noise current during and/or after the collapse event with a dummy inverter chain. Bit churning, bit obfuscation entropy enhancers and various post processing techniques may be employed to further harden the TRNG. An attack detection module may raise alerts when the TRNG is being attacked.

20 Claims, 10 Drawing Sheets

(56) References Cited

U.S. PATENT DOCUMENTS

| | | | |
|---|---|---|---|
| 2002/0186086 A1 | 12/2002 | Curiger et al. | |
| 2003/0101205 A1* | 5/2003 | Weimerskirch | G06F 7/588 |
| | | | 708/250 |
| 2004/0205095 A1* | 10/2004 | Gressel | G06F 7/582 |
| | | | 708/253 |
| 2009/0172056 A1 | 7/2009 | Pradhan et al. | |
| 2011/0163818 A1 | 7/2011 | Dichtl et al. | |
| 2011/0191129 A1 | 8/2011 | Moriya | |
| 2014/0325240 A1 | 10/2014 | Srinivasan et al. | |
| 2015/0154006 A1 | 6/2015 | Yang et al. | |
| 2016/0041814 A1 | 2/2016 | Idgunji | |
| 2016/0179472 A1* | 6/2016 | Sugahara | G06F 7/588 |
| | | | 708/251 |

OTHER PUBLICATIONS

B. Sunar, et al., "A Provably Secure True Random Number Generator with Built-in Tolerance to Active Attacks", IEEE Transactions on Computers, 2007, ieeexplore.iee.org, pp. 1-32. http://www.math.uwaterloo.ca/~dstinson/papers/rng-IEEE.

Bernhard Fechner, et al., "A True Random Number Generator with Built-in Attack Detection", Dependability of Computer Systems, 2008, http://www.fernuni-hagen.de/imperia/md/content/fakultaetfuermathematikundinformatik/pv/97-08/fechnert.

Dr. Sergei Skorobogatov, "Fault attacks on secure chips: from glitch to flash", Design and Security of Cryptographic Algorithms and Devices (ECRYPT II), Albena, Bulgaria, May 29-Jun. 3, 2011, http://www.cl.cam.ac.uk/~sps32/ECRYPT2011_1.pdf, pp. 1-64.

Greg Taylor et al., "Behind Intel's New Random-Number Generator", IEEE Spectrum, Aug. 24, 2011, http://spectrum.ieee.org/computing/hardware/behind-intels-new-randomnumber-generator, pp. 1-6.

Karen Mercedes Goertzel, "Integrated Circuit Security Threats and Hardware Assurance Countermeasures" Crosstalk, Nov./Dec. 2013, pp. 33-38.

Markus Dichtl, "Bad and good ways of post-processing biased physical random numbers," International Workshop on Fast Software Encryption. Springer Berlin Heidelberg, 2007, https://pdfs.semanticscholar.org.

Patrick Lacharme, "Post-Processing Functions for a Biased Physical Random Number Generator", International Association for Cryptologic Research, pp. 334-342, 2008.

Ricardo Gomes da Silva, Bachelorarbeit, "Practical Analysis of Embedded Microcontrollers against Clock Glitching Attacks", Mar. 17, 2014, pp. 1-53, https://rgsilva.com/Bachelorarbeit.pdf.

Vojaantonic, "True Random Number Generator for a True Hacker", Hackaday, Jun. 29, 2015, pp. 1-31, http://hackaday.com/2015/06/29/truerandomnumbergeneratorforatruehacker/.

Yang et al., "A 23Mb/s 23pJ/b Fully Synthesized True-Random-Number Generator in 28nm and 65nm CMOS", IEEE, International Solid-State Circuits Conference, ISSCC 2014/Session 16/SoC Building Blocks/16.3, Feb. 11, 2014.

"Fortuna: Cryptographically Secure Pseudo-Random Number Generation in Software and Hardware", Irish Signals and Systems Conference, ISSC 2006. Jun. 28-30, 2006, Dublin, Ireland, IET, IEEE, Jun. 1, 2006, pp. 457-462, ISBN: 978-0-86341-665-1, Jun. 28, 2006-Jun. 30, 2006, 6 pages.

"Improved Structure of True Random Number Generator with Direct Amplification of Analog Noise", Retrieved from the internet: https://otik.uk.zcu.cz/bitstream/11025/1042/1/r6c6c1.pdf, Dec. 31, 2012, 6 pages.

"International Search Report and Written Opinion", PCT Application No. PCT/US2017/053122, dated Dec. 18, 2017, 15 pages.

"Search and Examination Report", UK Application No. 1715234.9, dated Feb. 23, 2018, 6 pages.

"Foreign Office Action", Taiwanese Application No. 106128516, dated Jul. 31, 2018, 10 pages.

"International Preliminary Report on Patentability", PCT Application No. PCT/US2017/053122, dated Oct. 19, 2018, 12 pages.

"International Preliminary Report on Patentability", PCT Application No. PCT/US2017/053122, dated Oct. 2, 2018, 5 pages.

* cited by examiner

HARDENED RANDOM NUMBER GENERATOR WITH RING OSCILLATOR COLLAPSE TIME RANDOM TRUNCATION

BACKGROUND

A true random number generator can be susceptible to a variety of attacks from unauthorized adversaries, including, for example, active and passive side-channel attacks. Such side-channel attacks include active PVT (power, voltage, temperature) attacks in which PVT is actively manipulated or otherwise observed to bias the randomness of the bit stream or to detect the random values being output. Such techniques may allow the attacker to monitor the analog characteristics of power supplies, interface connections, as well as any electromagnetic (EM) radiation.

In addition, if not properly isolated or secured, a true random number generator can be vulnerable to various fault injection attacks, where an attacker maliciously introduces an error in a processor in order to alter the software execution (e.g., prevent the execution of an instruction, corrupt the data the processor is working with, bias the randomness of the data, etc.). Examples of such fault injection attacks include voltage glitching and EM glitching, which can cause predictable collapse times (e.g., active attacks).

Also, due to certain counting and collapsing aspects of a true random number generator, there may be a distinct power/EM profile that can be post-processed to determine the collapse count value.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to integrated circuits. More specifically, aspects of the present disclosure relate to a random number generator designed to be resistant to (hardened against) side-channel and other fault injection attacks.

An aspect includes a random number generator apparatus, comprising: an analog circuit including a ring oscillator configured to collapse from an unstable oscillation state to a stable oscillation state at a random collapse time; a counter counting a counter value representing the random collapse time; and a truncator generating a random number based on a truncation of the counter value.

A further aspect includes a pseudo-random number generator outputting a pseudo random value, the truncator having a variable truncation length that varies based on the pseudo random value.

A yet further aspect includes the pseudo-random number generator being seeded by the random number.

A still further aspect includes the pseudo-random number generator inputting a second random number wherein the second random number determines a number of cycles the pseudo-random number generator runs before providing the pseudo random value to the truncator.

An even further aspect includes the counter continuing to count the counter value after the collapse of the ring oscillator.

A still yet further aspect includes a dedicated voltage regulator providing dedicated power to the ring oscillator; and a power supply providing electrical power to parts of the random number generator other than the ring oscillator.

A further aspect includes the regulator being a low dropout regulator.

A still further aspect includes the counter being a Gray code counter.

An even further aspects includes the ring oscillator having a main ring oscillator and a reference ring oscillator, the reference ring oscillator configured to oscillate at a reference oscillation frequency; the apparatus further comprising: a phase frequency detector comparing phases of the reference ring oscillator against the main ring oscillator to detect a collapse event of the main ring oscillator; and a latch capturing the counter value based on the detection of the collapse event by the phase frequency detector, wherein the counter counts oscillations of the reference oscillator to derive the counter value.

An even further aspect includes a dedicated voltage regulator providing dedicated power to the main ring oscillator and the reference ring oscillator; and a power supply providing electrical power to parts of the random number generator other than the main ring oscillator and the reference ring oscillator.

A still further aspect includes an attack detection module XORing outputs of the main ring oscillator and the reference ring oscillator; and an analyzer detecting frequency locking of the main ring oscillator and the reference ring oscillator based on a predictable XOR output of the attack detection module.

A yet further aspect includes a bit obfuscator swapping bit locations of the random number.

A still yet further aspect includes a control register having bit locations or values each associated with one of several post processing methods; and a post processor having a plurality of post processing methods each enabled according to the associated bit location or value in the control register.

An even further aspect includes a buffer storing the random numbers including at least a first random number; and a bit churner XORing a newly received random number with a stored random number and storing a result in the buffer.

A yet further aspects includes a set of parallel dummy inverter chains enabled before or after collapse of the ring oscillator.

An even further aspect includes an attack detection module connected to one or more detectors and determining if the apparatus is under attack, said attack detection module forcing the apparatus into an idle state depending upon the attack.

Another aspect includes a device, comprising: a main ring oscillator configured to collapse from an unstable oscillation state to a stable oscillation state at a random collapse time; a reference ring oscillator configured to oscillate at a reference oscillation frequency; a counter counting oscillations of the reference ring oscillator to derive a counter value, wherein the counter value represents the random collapse time of the main ring oscillator; a truncator generating a random number based on a truncation of the counter value; and a pseudo-random number generator outputting a pseudo random value, said truncator having a variable truncation length that varies based on the pseudo random value.

Yet another aspects includes a device with a dedicated voltage regulator providing dedicated power to the main ring oscillator and the reference ring oscillator; and a power supply providing electrical power to parts of the random number generator other than the main ring oscillator and the reference ring oscillator.

A still further aspects includes a device further including a phase frequency detector comparing phases of the reference ring oscillator against the main ring oscillator to detect a collapse event of the main ring oscillator; and a latch capturing the counter value based on the detection of the collapse event by the phase frequency detector.

It should be noted that embodiments of some or all of the processor and memory systems disclosed herein may also be configured to perform some or all of the method embodiments disclosed above. In addition, embodiments of some or all of the methods disclosed above may also be represented as instructions embodied on a non-transitory processor-readable storage media such as optical or magnetic memory.

Further scope of applicability of the methods and systems of the present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

BRIEF DESCRIPTION OF DRAWINGS

These and other objects, features, and characteristics of the present disclosure will become more apparent to those skilled in the art from a study of the following Detailed Description in conjunction with the appended claims and drawings, all of which form a part of this specification. In the drawings:

Figure 1:
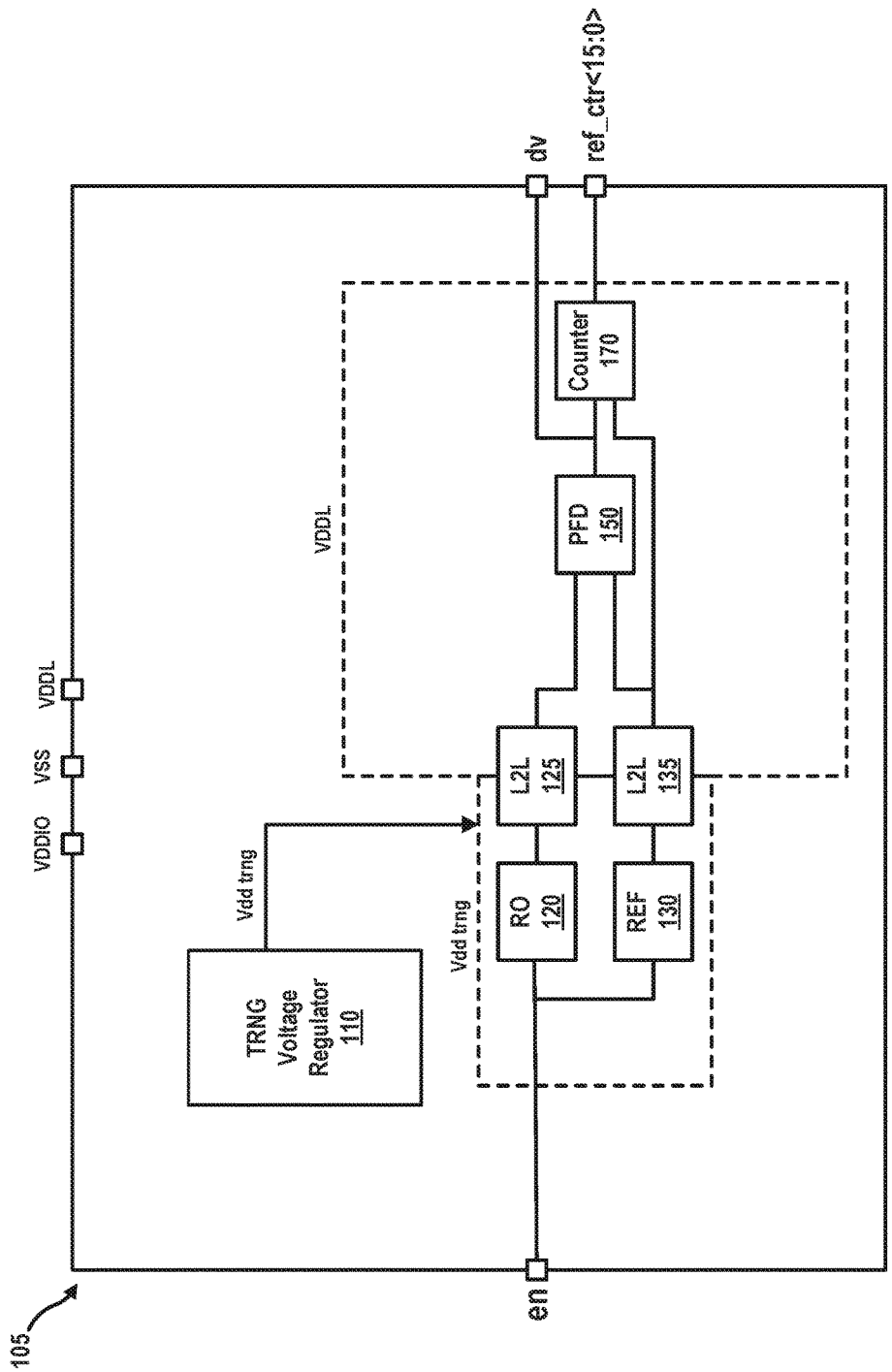
FIG. 1 is a block diagram illustrating an example analog portion of a high-level design for a true random number generator with a dedicated voltage regulator according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments of the methods and systems of the present disclosure will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include other features not described in detail herein. Additionally, some well-known structures or functions may not be shown or described in detail below, so as to avoid unnecessarily obscuring the relevant description.

Embodiments of the present disclosure relate to a true random number generator (TRNG) designed to be hardened to (e.g., resistant against or less sensitive to) hacking, side-channel and other types of fault-injection attacks.

In accordance with one or more embodiments, the TRNG of the present disclosure may be a part (e.g., component) of a security feature set for an application specific integrated circuit (ASIC). At a high level, the TRNG may take a source of entropy from the environment and convert that entropy into numerical values (e.g., at a certain rate, measured, for example, in bits per second) that may be used for a variety of applications (e.g., encryption, secret key generation, etc.).

In at least one embodiment, the TRNG may be included in an integrated circuit or a device, and includes an analog component/circuit/block and a digital component/circuit/block. For example, the analog component may be designed to execute a sequence, thereby converting entropy into a captured value with a certain amount of latency, and the digital component designed to store the captured value, restart the analog sequence, and check for consistency of results. Preferably, the TRNG should provide an undetectable, unbiased random bitstream that is invariant over PVT (power, voltage, temperature) regardless of any potential attacks (e.g., power, voltage, temperature, etc.) on the integrated circuit, also referred to as a chip.

In accordance with at least one embodiment, the TRNG may be based on the time a ring oscillator (RO) takes to collapse from an unstable state to a stable state. A counter is used to track how long the RO takes to collapse and the count values (random numbers) generated in this fashion have a log-normal distribution. The counter values representing the time to collapse are then truncated (modulo) to approximate a uniform distribution (with such uniform distribution being a requirement of a truly random number generator). It is to be understood that the term "True Random Number Generator" is a broad term that includes approximately uniform distributions. Indeed, the ring oscillator used as an entropy source may itself be biased, other components may introduce a bias and, for example, over a short time window the count values may not exhibit completely uniform distributions that would otherwise be the case for a larger sample size of counter values. Moreover, the definition of "True Random Number Generator" is one that uses entropy as a source of randomness and/or where the probability of generating any particular number is approximately the same as every other number each time a number is generated.

FIG. 1 shows a TRNG in accordance with one or more embodiments and particularly illustrates components and their power domains. The analog core 105 of the TRNG may include a TRNG voltage regulator 110 (e.g., a LDO regulator), a phase-frequency detector (PFD) 150, ring oscillators (120, 130), level shifters 125, 135 (used to safely transition the RO signals between two voltage domains (VDD-TRNG and VDDL)), and counter 170 all of which are conventional elements, but are arranged and functioning in a unique and inventive ways.

As will be described in greater detail below, the TRNG of the various embodiments may include a number of features and/or functionalities to reduce side-channel attack sensitivity and/or reduce side channel leakage so that a listener cannot detect when the collapse events are starting and stopping.

For example, the dedicated DC linear voltage regulator 110 may be used in the core TRNG analog circuits with the rest of the circuitry being separately supplied power.

More specifically, the voltage regulator 110 may provide a dedicated power supply (Vdd trng) to the ring oscillators (120, 130) and L2L circuits 125, 135. Separate power supplies supply voltage to the other elements of the analog core 105 via pinouts VDDIO, VSS and VDDL.

Isolating the ROs 120, 130 from the rest of the circuits can help reduce self-locking effects of the ROs. For example, the PFD 150 and counter 170 can inject large current pulses into the ground which couples to the ROs 120, 130. Since these current pulses are harmonically related to the RO 120, 130 frequencies they can potentially lock and never collapse. The dedicated voltage regulator 110 solves this problem by providing a dedicated power supply to the ROs 120, 130 and the level shifters L2L 125, 135.

In accordance with at least one embodiment, the voltage regulator 110 may be a low-dropout (LDO) regulator with high PSRR (Power Supply Rejection Ratio) and variable output voltage that is capable of maintaining its specified output voltage over a wide range of load current and input voltage, including when the input/supply voltage is very close to the output voltage.

Using a dedicated DC linear voltage regulator 110, such as a LDO regulator, in the manner described herein further allows for isolating the ring oscillators ROs 120, 130 from any outside interference (as well as on-chip noise, which can affect the collapse distribution).

Depending on the implementation, the TRNG design of the present disclosure may be capable of, for example, 40 dB of power supply rejection (100× amplitude reduction) over all frequencies of interest from external power supply attacks. It should also be noted that on-chip coupling from other digital blocks has negligible impact on performance of the TRNG.

Figure 2:
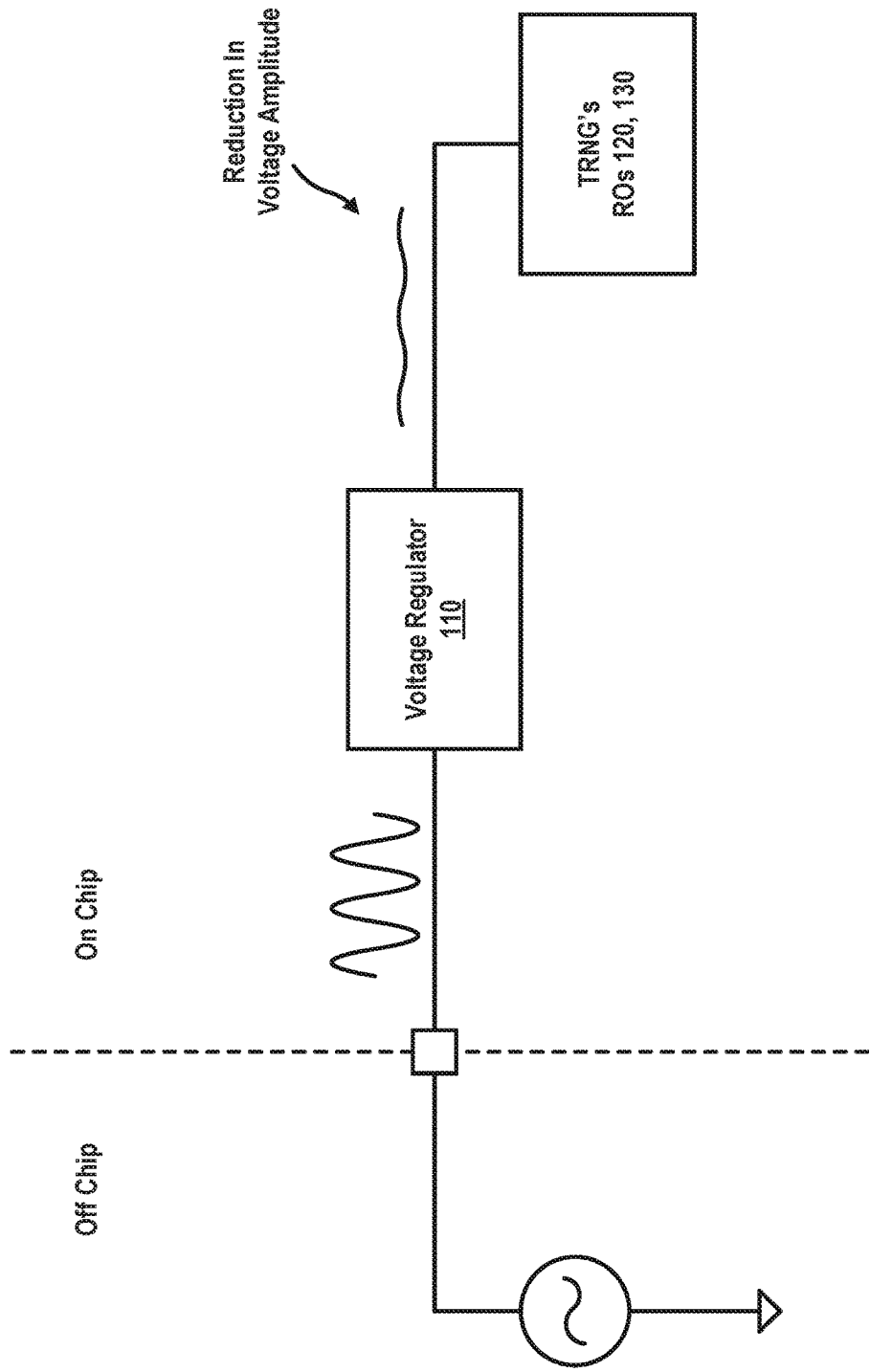
FIG. 2 is a block diagram illustrating an example of the reduction in voltage amplitude variations when an LDO (low dropout) regulator is present between the external supply and the on-chip TRNG according to one or more embodiments described herein.

FIG. 2 illustrates an example of the reduction in voltage amplitude and voltage amplitude variations that may occur when a voltage regulator 110, such as, for example, a LDO linear voltage regulator, is arranged between an external supply voltage and an on-chip TRNG.

Figure 4:
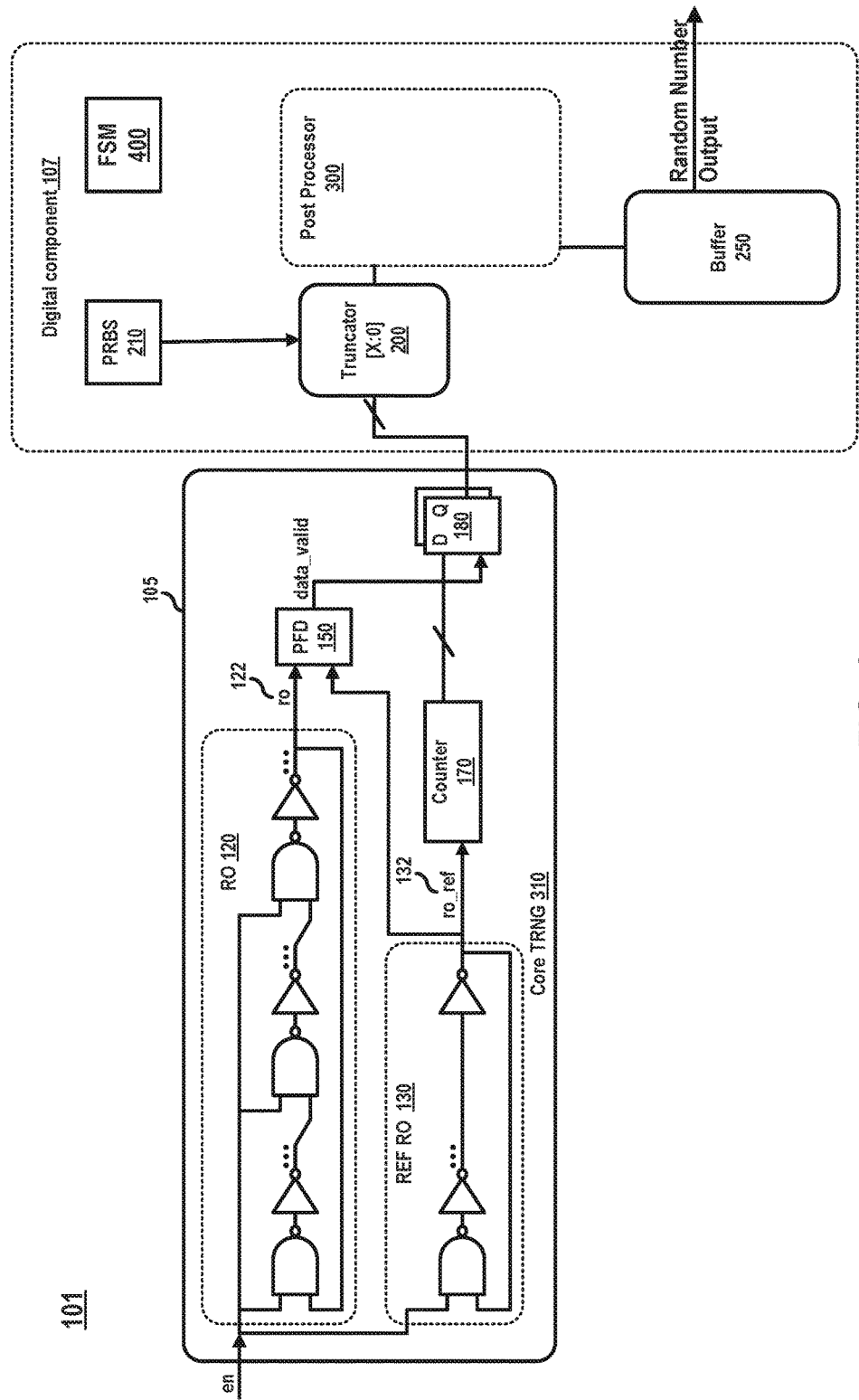
FIG. 4 is a block diagram illustrating an example high-level design for a true random number generator with a truncator, post processor and buffer according to one or more embodiments described herein.

As better illustrated by FIG. 4, in one or more embodiments the TRNG 101 of the present disclosure may use the collapse time of a main ring oscillator (RO) 120 that is initialized in a 3× mode (three enable (en) pulses) and eventually collapses to a stable 1× mode as a result of accumulated jitter (e.g., thermal noise). A Phase-Frequency Detector (PFD) 150 may be configured to compare the 3× RO to a reference ring oscillator RO 130 (1.5×) in order to detect the collapse event by the main ring oscillator RO 120. More specifically, the PFD 150 detects the collapse event of main ring oscillator RO 120 and sets a data valid output to the latch 180 in order to capture the state of a counter 170 that is being incremented according to the ro_ref output from the reference ring oscillator RO 130. The resulting reference-cycles-to-collapse distribution is log-normal. The stored count value from latch 180 is then truncated by truncator 200. According to experimental results, truncation of the counter bits results in a distribution that approaches uniform.

A further example feature of the TRNG 101 of the present disclosure that is designed to reduce side-channel attack sensitivity is random variation of truncation length for the TRNG counter 170. For example, in accordance with at least one embodiment, there is a range of bits that the TRNG counter 170 can be truncated to while still maintaining a nearly uniform distribution (and thus a statistically random output bit stream).

A PRBS 210 (e.g., which may be periodically re-seeded by the TRNG 101) may be used to command truncator 200 such that truncator 200 randomly varies the bits taken after truncation in order to obfuscate the actual value used in the output random number bit stream. In this manner, even if a potential attacker was able to guess the final count value of counter 170, the actual output value would gain additional opacity due to the random variation of truncation length.

In a further embodiment, the PRBS 210 may be a very large PRBS. A PRBS is a conventional element that is typically constructed by creating a LFSR (Linear Feedback Shift Register) that taps off different points in the register and feeds the XORed values of these points back into the input. These taps are chosen (there are well-known lookup tables for these) such that a "maximal-length" PRBS can be constructed that will repeat after roughly $2^N$ cycles. So, if N (the number of flip flops in the LFSR) is large, the LFSR will effectively never repeat (e.g. $2^{128}=3.4\times10^{38}$ cycles, which corresponds to $1.4\times10^{31}$ seconds if the clock period is 41 ns, which corresponds to $\sim1\times10^{23}$ years).

In addition to being periodically seeded by the TRNG 101, a second TRNG value may be used to determine the number of cycles the PRBS 210 runs before providing a valid output to truncator 200.

Another example feature designed to harden the TRNG of the present disclosure against potential fault-injection attacks, such as side-channel attacks, includes constant current consumption to mask a collapse event (e.g., main ring oscillator RO 120 collapse event). One concern for the TRNG is side channel analysis. In theory, an attacker could monitor (perhaps with an antenna, since high frequency current will be local to the TRNG) the power consumption of the TRNG 101 during operation. There will be a fairly distinct power signature from the TRNG analog core 105, 106 as the main ring oscillator 120 collapses and changes from 3× to 1× frequency. In an effort to reduce the SNR (signal-to-noise-ratio) of the power signature, aspects attempt to normalize the current consumption of the TRNG core over the entire random number gathering event.

Figure 3A:
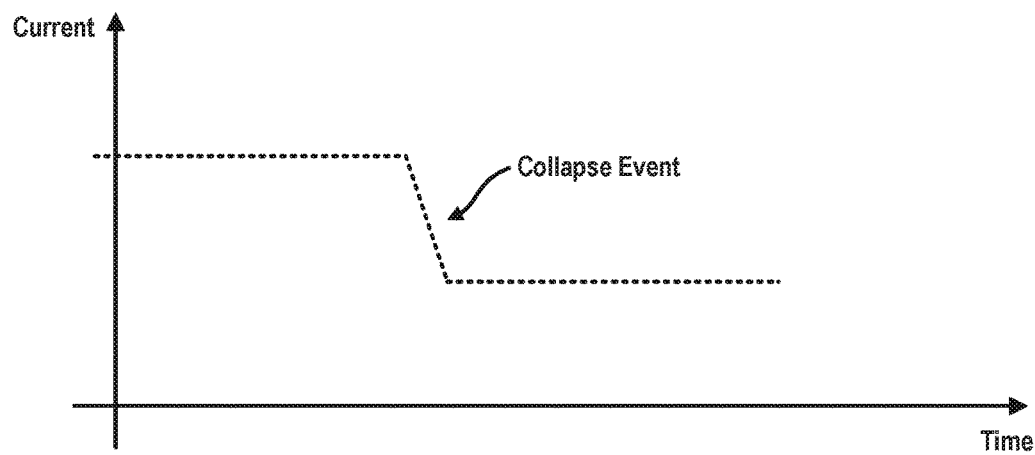
FIG. 3A is a graphical representation illustrating an example current consumption profile for a true random number generator without side-channel hardening.
Figure 3B:
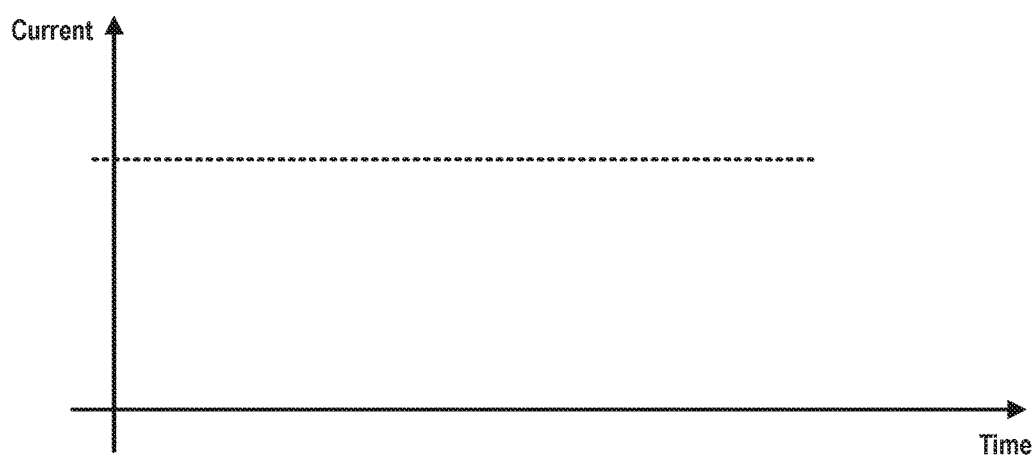
FIG. 3B is a graphical representation illustrating an example current consumption profile for a true random number generator with side-channel hardening according to one or more embodiments described herein.

One way in which current consumption is normalized is to use a Gray code counter. For example, in an implementation where counter 170 is implemented with a binary counter that is used to count reference ring oscillator RO 130 cycles, the TRNG may have a very distinct power profile such as shown in FIG. 3A. Such a power profile coupled with a Fast Fourier Transform (FFT) of the ROs of the TRNG could potentially lead to substantially easier decoding of TRNG random number output values. As such, in accordance with at least one embodiment, a Gray code counter may be utilized to implement counter 170. Gray code counters have a very consistent power profile over counter values because only one bit is changed when incrementing the count value. Thus, the TRNG 101 is further hardened by using a Gray code counter 170 in this way. FIG. 3B illustrates an average current consumption with side-channel hardening in which the current does not vary with time.

Another means of normalizing current consumption is to add noise current during and/or after the collapse period. FIG. 5B illustrates an embodiment that uses dummy inverter chains for this purpose. To normalize the current consumption, let's first assume that for the main ring oscillator 120, i3x~=3*i1x. As further shown in FIG. 5B, a set of parallel dummy inverter chains 900 are provided between L2L 135 and PFD 150. The parallel dummy inverter chains 900 are driven by the fixed 1.5× oscillator RO 130 and may be designed to have 2*i1x total current consumption, where each inverter chain is delayed relative to the 1.5× clock (to spread out transients in time). To better match the frequency of the main ring oscillator RO 120, a doubler circuit could be added so that this dummy chain is oscillating at ~3×.

In at least some embodiments, these dummy inverter chains 900 may be enabled (en_dmy) before and/or after main ring RO 120 collapse occurs: enabling before would reduce the signal to noise ratio of the actual collapse, while enabling after would aim to maintain constant current consumption. More specifically, en_dmy can either be tied to the main enable signal en (dummy inverters enabled before collapse) or tied to the PFD 150 output (inverters enabled after collapse).

Another method for stabilizing current consumption would be to allow the counter 170 to continue incrementing after collapse of main ring oscillator RO 120, while only flopping (via latch 180) the output value when collapse occurs. A second counter (with a stop_value created by a PRBS) could be used to determine when the valid data is sent to the truncator 200. Such a second counter effectively introduces a random delay for outputting the random number to the truncator 200 and thereby makes SCA more difficult. From a current-consumption perspective, aspects use various techniques to push larger current spikes to points in time not as closely related to the actual collapse time of the main ring oscillator RO 120 thereby hardening the TNRG 101.

Another way to harden the TNRG 101 is to increase the current consumption of the TRNG block, effectively reducing the signal-to-noise ratio (SNR). This could potentially be achieved by having a fixed bias current that is pulled from the LDO voltage regulator 110, and the current source is reduced as the TRNG current consumption increases. In other words, adding extra "bleed" current to the LDO 110 can reduce LDO voltage variations when current consumption changes (like when the RO 120 collapses) at the cost of extra current. This bleed current could be varied as the state of the ROs change, though, with the goal of maintaining constant current consumption. Further aspects of hardening the TRNG involve the oscillators 120, 130. For example, instead of disabling the oscillators 120, 130 when the main oscillator 130 collapses (as the FSM 400 may do in some embodiments), one may change the wait time for when a new random number event is initiated (either randomly or with a fixed period longer than the average collapse time).

In accordance with one or more embodiments, although the TRNG of the present disclosure may predominantly be an analog block, substantial digital support may be needed for certain features and/or functionalities. For example, digital operations may be needed to extract and format the data output of the TRNG into a useful random bit stream. In at least one embodiment and as shown in FIG. 4, the data output by the analog component 105 of the TRNG 101 (after truncation by truncator 200 and optional processing by post processor 300) may be stored in a buffer 250 (e.g., FIFO buffer).

The buffer 250 is preferably configured such that the stored data can be read only a limited number of times (e.g., once). Such a buffer 250 may have, for example, a depth of 64 bits and a width of 32 bits. However, the buffer 250 may be of various other characteristics and dimensions depending on the implementation. Although the buffer 250 has been defined in FIFO style to permit controlled inflow and outflow for better obscurity and security, the buffer 250 may also be constructed with any register, multi-input, multi-output flow, multi-level storage of any sizing depending on the TRNG's security implementation. Furthermore, if the buffer 250 becomes full, the TRNG can be set into a "churn mode" to continuously collect more collapse values (counter 170 values) and mix them into the buffer to further mask the next read value of the buffer 250 as further explained below in relation to FIG. 8 and bit churner 340.

Figure 5A:
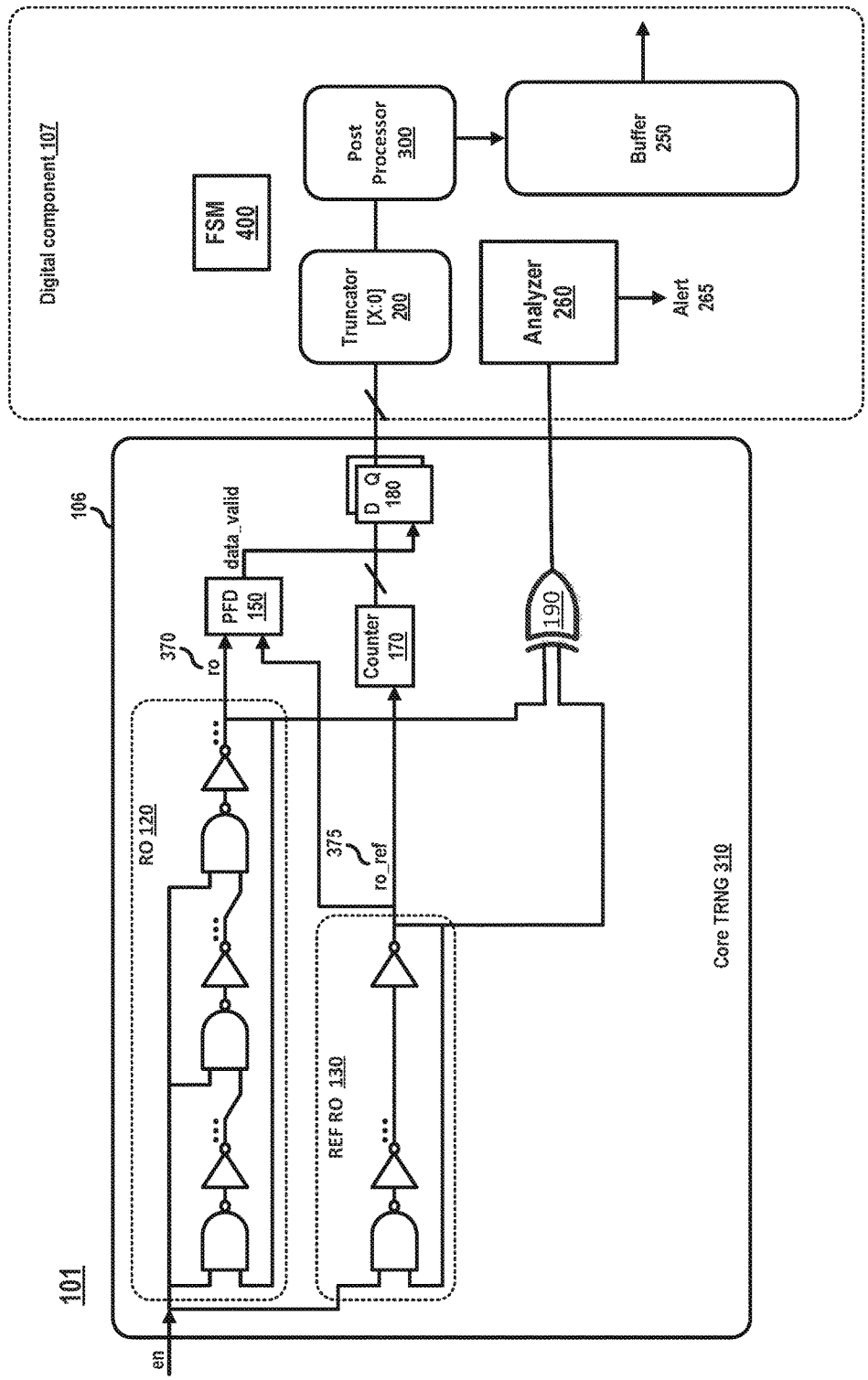
FIG. 5A is a block diagram illustrating an example high-level design for a true random number generator with an XOR circuit and an analyzer according to one or more embodiments described herein.
Figure 5B:
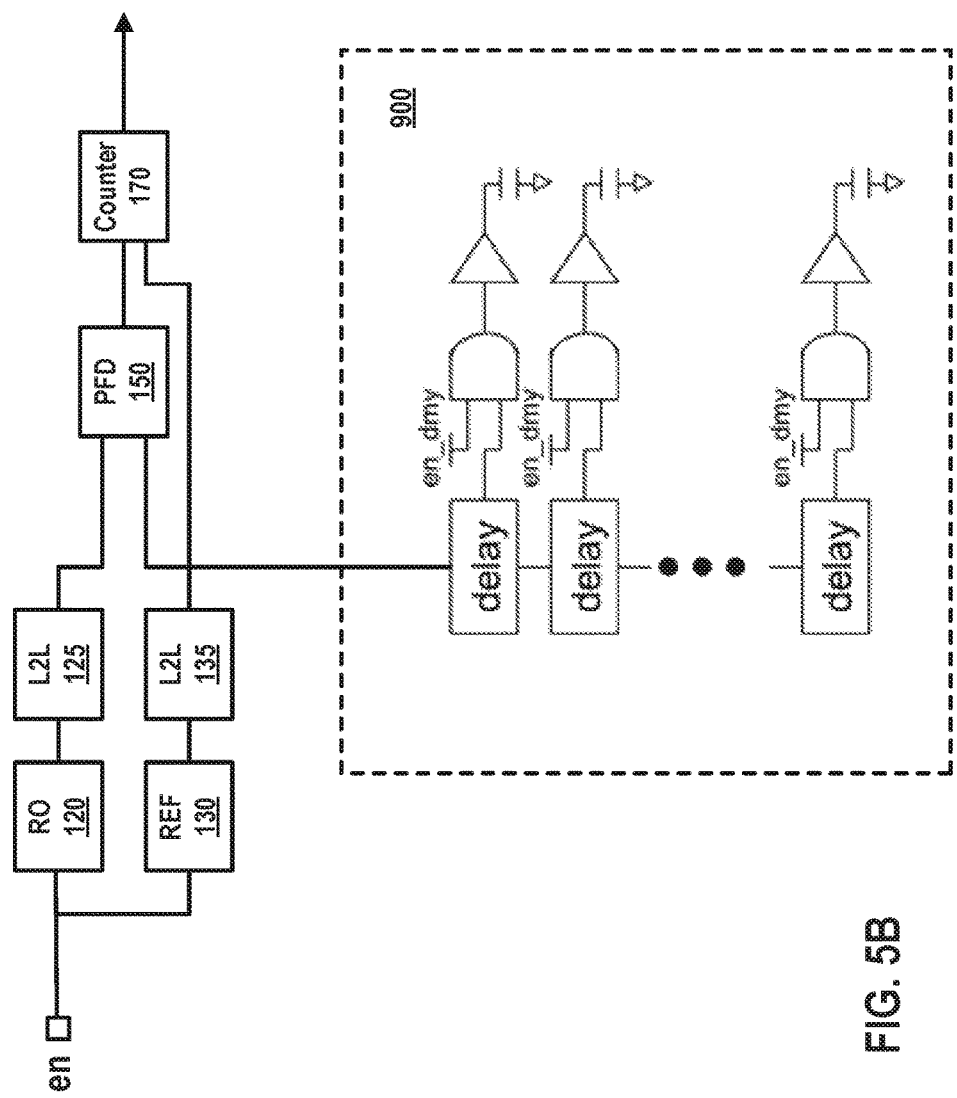
FIG. 5B is a block diagram illustrating an example high-level design for a true random number generator with dummy chains according to one or more embodiments described herein.

FIG. 5A illustrates an alternative embodiment for the analog block 106 which includes in-place attack detection mechanisms and/or measures. In accordance with at least one embodiment and as shown in FIG. 5A, the outputs of either or both ring oscillators 120, 130 may be XORed together by XOR 190.

The XORed result is then processed by an analyzer 260 to check for any potential locking that is determined by a predictable XOR output. Such a technique can be used to raise an Alert 265 that, for example, disables the TRNG (FSM idle state 450) or discards values from the buffer 250 when an attack is detected. Analyzer 260 may check waveform characteristics to detect the presence of predictable patterns that may arise when XOR-ing 190 the RO 120, 130 outputs together. If those patterns remain stable over a certain amount of time, one can assume that the ROs 120, 130 are locked and will not collapse. Such an analysis by analyzer 260 is based upon empirical observations. The TRNG FSM 400 would respond to the alert generated by analyzer 260 and could do many things (e.g. immediately disable the TRNG, wait a relatively long period of time before generating new random numbers, clear the buffer 250 and refill again before providing new numbers, etc).

As previously mentioned, the TRNG 101 includes an analog block/component 105, 106 and a digital component 107 (e.g. the truncator 200, PRBS 210, post processor 300, entropy analyzer and finite state machine 400). The digital component may be implemented in various ways as further described below in reference to FIG. 9.

The digital component 107 of the TRNG may be configured to enable the analog component 105, 106 to process and send out data. For example, in accordance with at least one embodiment, the enabling of the analog component 105, 106 to process and send out data may be controlled by a finite state machine (FSM) 400 in the digital component 107, as generally illustrated in FIGS. 4-5.

Figure 6:
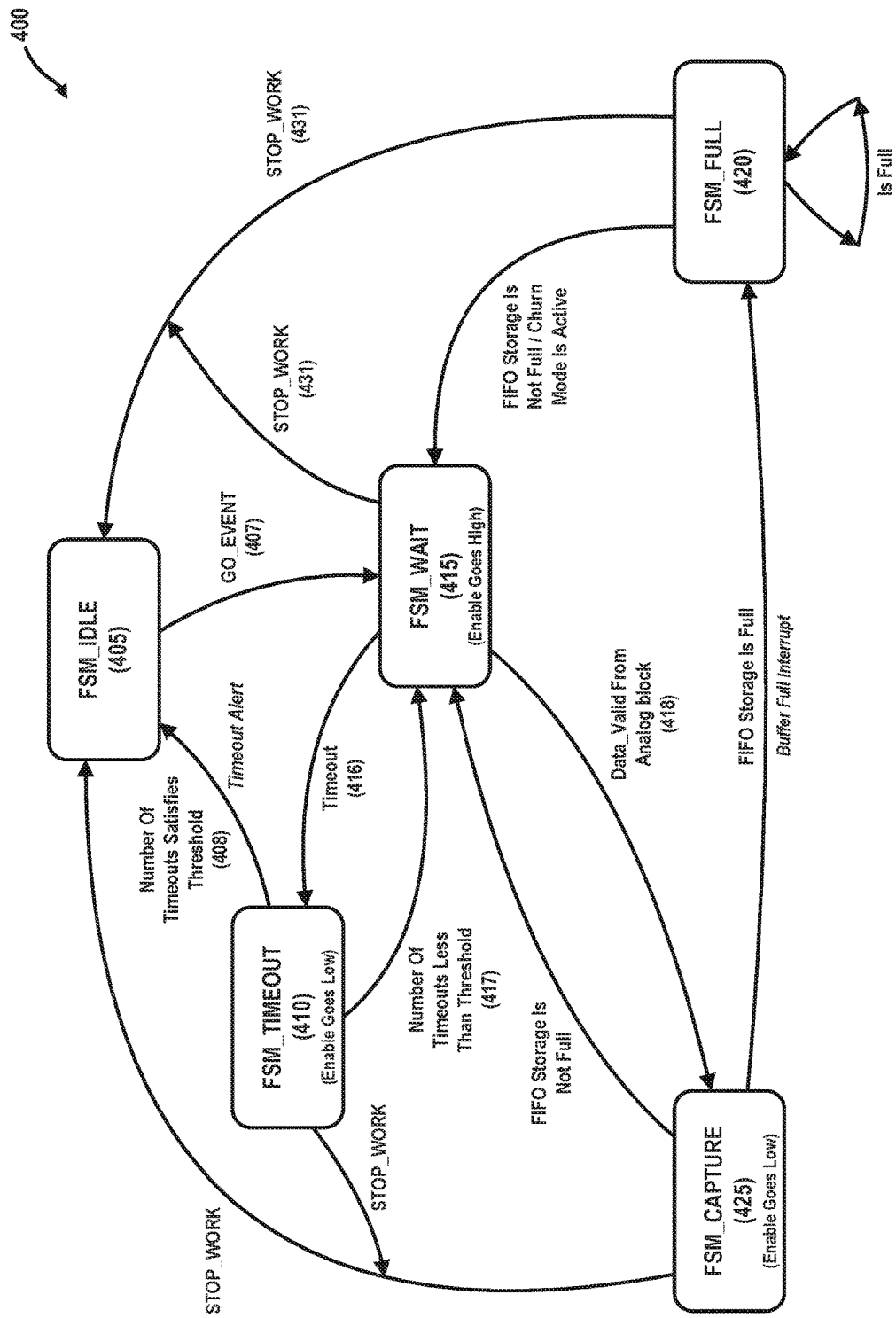
FIG. 6 is a state diagram illustrating example states for a digital block of a true random number generator according to one or more embodiments described herein.

An example of such a FSM 400 is shown in FIG. 6, where blocks 405-425 represent example states of the FSM 400, the arrows represent transitions between states, and the labels by each arrow indicate the input corresponding to the state transition. The various states of the example FSM 400, as well as the state transitions and corresponding inputs will be described in greater detail below.

FSM_IDLE (405) may be an initialization state. In at least one embodiment, FSM_IDLE (405) may be the default state of the FSM 400 following, for example, a reset or an interrupt to the FSM 400. An interrupt to the FSM 400 may occur for a number of reasons including, for example, changes in the voltage regulator 110 settings or due to multiple timeouts (e.g., if the number of timeouts is greater than a programmable threshold number or maximum number of timeouts). The idle state is the safe shut-down state if the chip detects a threat in the TRNG or potential attack on the system. In any such scenario, the FSM 400 may reset to FSM_IDLE state (405) while the FSM 400 works on the interrupts. If the FSM 400 asserts a "GO_EVENT" signal (407) to the analog component 105/106 of the TRNG 101, then the FSM 400 may transition from FSM_IDLE state (405) to FSM_WAIT state (415).

In accordance with at least one embodiment, when the FSM 400 is in the FSM_WAIT (415) state, an ENABLE signal (e.g., action, instruction, etc.) to the analog block 105/106 of the TRNG may be asserted (e.g., sent, provided, etc., as denoted by "enable goes high" in the FSM_WAIT (415) state), and the digital block 107 of the TRNG 101 may wait for a "data_valid" signal (418) to be asserted from the analog block 105, 106. During the FSM_WAIT (415) state, a timeout counter (not shown) may be ticking or incrementing so as to avoid waiting indefinitely in this state for the analog block 105, 106 to prepare its data output. If, for example, the timeout counter is outrun (e.g., number of timeouts reaches threshold number of timeouts, which may be a predetermined threshold, an adjustable threshold, or both), then a timeout signal (416) may be input to the FSM_TIMEOUT (410) state and the FSM 400 may transition from the FSM_WAIT (415) state to the FSM_TIMEOUT (410) state. On the other hand, if the data_valid signal (418) from the analog block 105, 106 is asserted before the timeout counter is outrun, the FSM 400 may transition from the FSM_WAIT (415) state to the FSM_CAPTURE (425) state.

Where the FSM 400 transitions to the FSM_TIMEOUT (410) state, ENABLE may be asserted as a timeout (416) has occurred. In such a scenario, the FSM 400 may determine (e.g., check, assess, etc.) whether the number of timeouts has satisfied a programmable condition of the FSM 400. In accordance with at least one embodiment, the programmable condition may be a threshold maximum number of allowed timeouts (408). The threshold maximum number of allowable timeouts may be determined, for example, according to a value given in a register of the TRNG accessible by an associated application program 722 (e.g., software). If the number of timeouts has not satisfied the programmable condition (e.g., the number of timeouts is less than the threshold maximum number of allowed timeouts (417)), the FSM 400 may transition from the FSM_TIMEOUT (410) state back to the FSM_WAIT (415) state. In at least one implementation, the FSM 400 may transition back to the FSM_WAIT (415) state after a certain number of cycles, which may depend on the number of cycles needed for the analog block to clear its current processing and start fresh, or send a STOP_WORK interrupt and go back to FSM_IDLE state (405). The number of cycles may be, for example, 16 cycles but it is to be understood that the disclosure is not limited to this value.

In the FSM_CAPTURE (425) state, the digital component 107 (e.g. truncator 200 and buffer 250) captures the raw data bits coming from the analog block 105, 106. Based on the post-processing method, which is selectively enabled by the FSM 400, the random bits may be post-processed by post processor 300 including, for example, sliced, XORed, rotated, churned, and the like, before being stored. Also FSM_CAPTURE (425) state drops the enable signal to analog block 105, 106, so that the analog block 105, 106 can clear its counter 170 and get ready for producing the next random value.

It should be understood that the FSM 400 (FIG. 5A) may include one or more other states in addition to or instead of the example states described above. For example, in accordance with at least one embodiment, FSM 400 may also be in FSM_PRECHARGE: precharge state (not shown). After every wakeup, the FSM can wait in this state for around N cycles until the analog component settles down after waking up. This state includes the one-time setup for both analog component 105, 106 and digital component to return to stable state after power-up. It can also compromise if any pre-scrambling time is needed for post processing techniques.

In at least one embodiment, the PFD 150 (FIG. 5A) may have a conventional digital PFD implementation with glitch-removal and a two bit shift register (not shown) to filter out narrow pulse widths around the collapse time. The shift register may also provide synchronization of the PFD output with the reference RO (e.g., REF_RO130 in the example analog block 106 shown in FIG. 5A), which helps avoid meta-stability issues in the counter 170.

When the PFD 150 transitions due, for example, to a collapse event, the data valid output signal from the analog block 105, 106 may transition from 0 to 1, the counter 170 may stop incrementing, and the final counter value may be flopped by latch 180. Flopping the final counter 170 value in this manner helps avoid routing high frequency signals to the FSM 400, which unnecessarily wastes power. To ensure that the counter 170 values have settled at the FSM input, the FSM 400 may be configured to wait for a period of time before accepting the counter 170 value. This period of time may be, for example, at least one clock cycle of the FSM 400. This can be done by adding a flop pipeline (e.g. low pass filter or de-glitcher) at the input.

Figure 7:
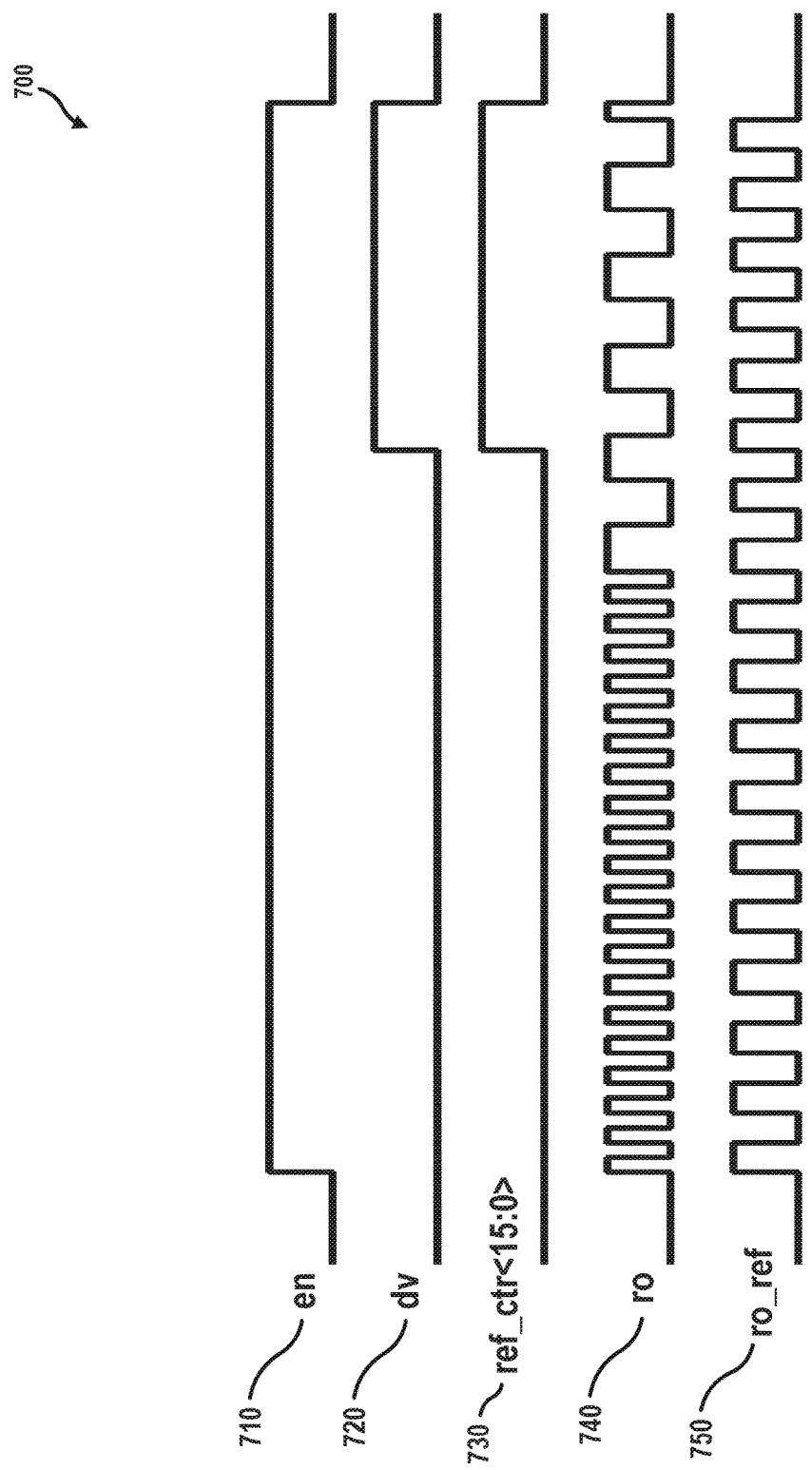
FIG. 7 is a timing diagram illustrating example timing for a true random number generator according to one or more embodiments described herein.

An example timing diagram 700 for a TRNG 101 in accordance with one or more embodiments of the present disclosure is shown in FIG. 7. It should be noted that while en 710 remains high, the oscillators (120, 130) remain enabled, even after the collapse of RO 120. The output signals data valid (dv) 720 and ref_ctr 730 remain active until en 710 is disabled, at which point all outputs are set to 0.

It should be understood that various features and functions of the TRNG 101 are designed and implemented to further reduce the chance of Side Channel Analysis (SCA), including bit obfuscation (explained below), XOR of bits, use of a Gray Code counter for counter 170, and attempts to maintain constant current consumption.

Furthermore, statistical checking (via hardware and software) provides an added layer of detection robustness of the TRNG output stream. Hardware checks include, for example, mono-bit frequency (number of ones in stream) for output stream and each bit location, average/max/min collapse values, and the like.

Software checks may include various post-processing techniques performed by the post processor 300 as further explained below.

In accordance with one or more embodiments, the TRNG 101 of the present disclosure may also include one or more additional features designed to protect the TRNG 101 against various types of fault-injection or side-channel attacks. For example, bit obfuscation may be attained through swapping bit locations, for example, after truncation and/or with various post-processing techniques (e.g., XORing, Von Neumann, etc.). Such bit obfuscation ability adds additional attack difficulty and further masks the TRNG output value.

Figure 8:
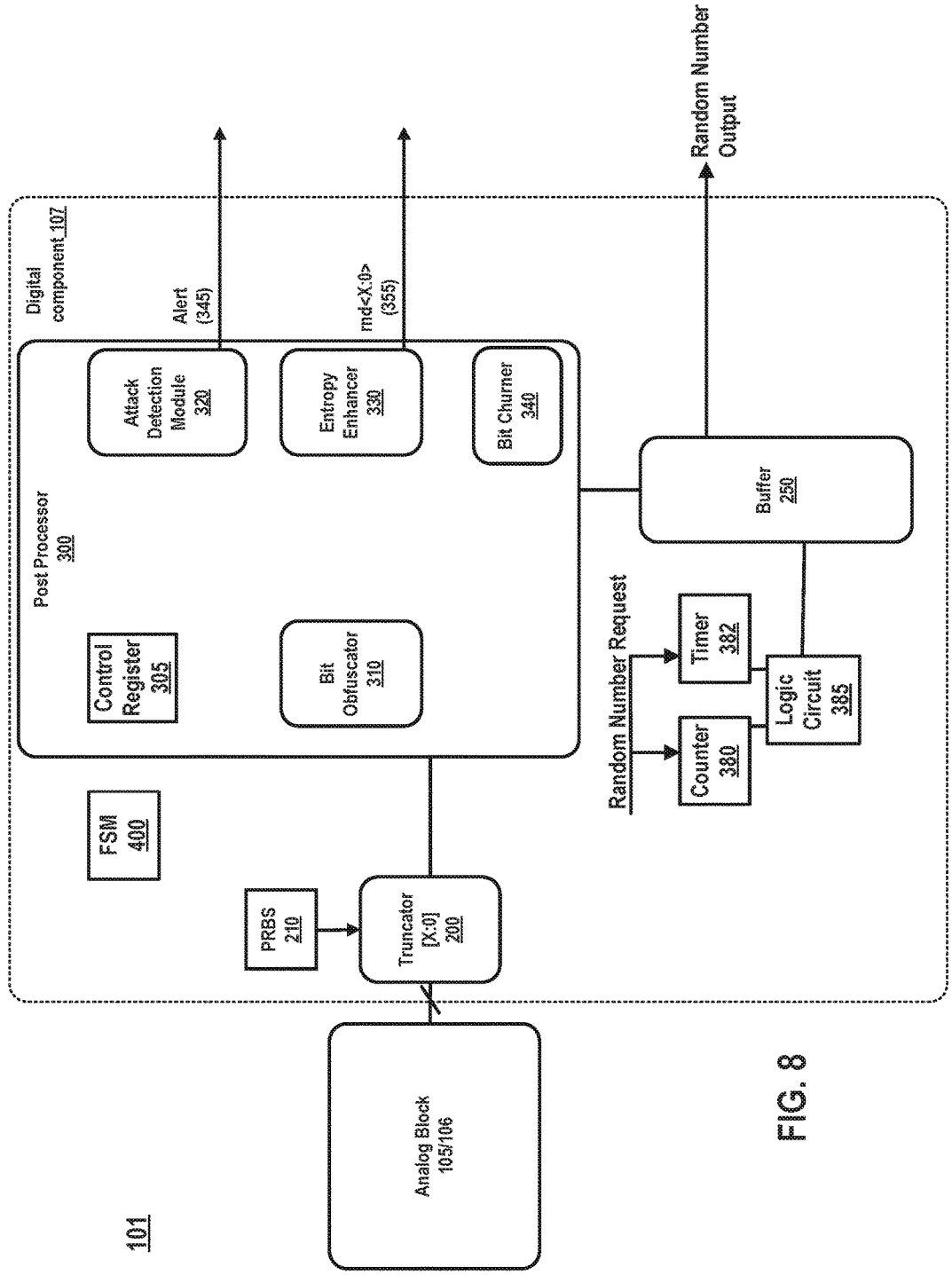
FIG. 8 is a block diagram illustrating an example high-level design for a true random number generator showing details of a post processor according to one or more embodiments described herein.

As shown in FIG. 8, post processor 300 may receive the random number from truncator 200. The post processor 300 may implement various post processing techniques such as the software checks mentioned above. A control register 305 may be provided with, for example, each bit of the control register corresponding to one of the post processor 300 modules such as bit obfuscator 310, attack detection module 320, entropy enhancer 330, and bit churner 340. Setting of a control register 305 bit enables the corresponding post processing module/technique. Instead of using a one-to-one correspondence between control register 305 bits, values stored in the control register 305 may uniquely correspond to desired enablement of one of the post processing methods performed by the post processor 300 using, for example, a decoder to decode the value stored in the control register 305.

The FSM 400 may be used to set the control register 305 bit(s) to provide a range of control over which post processing modules/techniques are utilized.

According to an aspect, a bit obfuscator 310 may be included in the post processor 300. The bit obfuscator 310 may shuffle or swap bit locations in the random number output. One such bit swapping technique is to mirror the random number (string) around its center point (e.g. MSB and LSB bits exchange position) but various other techniques for swapping or shuffling the bits that comprise the random number output may be utilized by bit obfuscator 310.

In other aspects, the post processor 300 may further include an entropy enhancer 330 to remove bias and otherwise increase the entropy of the random number being output. The entropy enhancer 330 may reduce the bias of random bits using an XORing technique in which successive bits of the random number output stream are XORed together. If we assume that the amount of bias is denoted as e, then the probability of a random bit being a 1 or a 0 can be defined as:

$$Pr(x = 1) = \frac{1}{2} + e$$

$$Pr(x = 0) = \frac{1}{2} - e$$

Using these definitions, one can calculate the probability of the output of a post processing step (and its residual bias) as well as the throughput of the processing. One way to reduce the bias of random bits is by XORing successive bits together. The probability of the XOR output being 1 can be expressed as the following:

$$Pr(y = 1) = \left(\frac{1}{2} + e\right)\left(\frac{1}{2} - e\right) + \left(\frac{1}{2} - e\right)\left(\frac{1}{2} + e\right) = \frac{1}{2} - 2e^2$$

An XOR operation on successive bits does not completely remove the bias, but instead transforms it from e to $2e^2$. For 1% bias, this corresponds to a 5× reduction in bias, however, the throughput is cut in half (two bits in, one bit out).

Entropy enhancer 330 may implement other techniques that generally involve compression to remove all bias from the TRNG 101 output. Some potential compression techniques include: a. Linear compression (BCH codes) b. Von Neumann compression (the truth table for Von Neumann compression is shown in table 1 below). For bit streams that are not heavily biased (equal number of 1's and 0's), the algorithm is relatively efficient (only reduces throughput by 2×). However, if long streams of similar bits exist, throughput could drop significantly.

TABLE 1

(Von Neumann compression)

| A | B | Out |
|---|---|---|
| 0 | 0 | — |
| 0 | 1 | 0 |
| 1 | 0 | 1 |
| 1 | 1 | — |

For von Neumann compression the probability that the output is 1 can be calculated using the following equation:

$$Pr(y = 1) = \frac{\left(\frac{1}{2} + e\right)\left(\frac{1}{2} - e\right)}{\left(\frac{1}{2} - e\right)\left(\frac{1}{2} + e\right) + \left(\frac{1}{2} + e\right)\left(\frac{1}{2} - e\right)} = \frac{\frac{1}{4} - e^2}{2\left(\frac{1}{4} - e^2\right)} = \frac{1}{2}$$

As shown, Von Neumann compression completely removes bias from the bitstream.

Unfortunately, this comes at a throughput cost. The probability that the inputs result in a valid output is $2(\frac{1}{2}+e)(\frac{1}{2}-e)=2(\frac{1}{4}-e^2)$. However, the process still reduces two input bits to one output bit, resulting a throughput of $\frac{1}{4}+e^2$. Note that the best case throughput, meaning no bias is present, results in ¼ the rate of the input bits. This is an expensive tradeoff to make. As also shown in FIG. 8, aspects may include (e.g. firmware) checks for a "reasonable" number of random number requests. The firmware within the digital component 107 may include a counter 380, timer 382 and logic circuit 385. The counter 380 and timer 382 receive a random number request and respectively count the number of random numbers being requested and the timing of such requests. The logic circuit 385, for example, may compare the counter 380 and timer 382 values to thresholds to determine if an attacker is asking for random numbers in a manner that does not match the normal use case. An example of a normal use case is a maximum number of random number requests over a fixed time period. Various other normal use cases can be defined and are within the scope of this disclosure.

The normal use case of the TRNG 101 may be determined and may also be application specific such that the algorithm applied by logic circuit 385 may be adapted (e.g. threshold adaptation or some other, more complex algorithm that defines a normal use case). If logic circuit 385 determines that the random number requests are outside of the normal use case then protective action may be taken such as shutting down the TRNG 101 (Idle state 405 of FSM) and/or disabling the buffer 250.

According to other aspects, the post processor 300 may include an attack detection module 320 which may implement one or more of a suite of techniques to determine if the TRNG 101 is under attack. To provide further robustness against potential attacks, the TRNG 101 of the present disclosure may also include one or more detectors (e.g., temperature, supply glitches, etc.) that will alert the FSM 400 and disable the TRNG in the event of attack (e.g. by entering Idle state 405). The attack detection module may also run a subset of the NIST test suite (memory limited) as well as simpler checks.

Another technique that may be implemented in the post processor 300 is a bit churner 340. The bit churner overlays new data over the old data. In more detail, the bit churner may XOR a newly obtained random number from truncator 200 back into a previously obtained random number stored in the buffer 250. Such bit churning may be activated as soon as there is at least one random number stored in the buffer 250. In an alternative, bit churning may be activated when the buffer 250 is full. The bit churner 340 serves several purposes including keeping the power consumption by the analog block 105, 106 constantly active thereby making it more difficult to detect the collapse time of RO 120 and to increase the randomness of the bits (cracking once is not enough to decode the random numbers being stored by buffer 250 and the attacker would need to keep track of every single collapse to figure out the bits. As such, the bit churner 340 exponentially reduces the probability for successful side-channel attack and increases the obscurity of the data.

Figure 9:
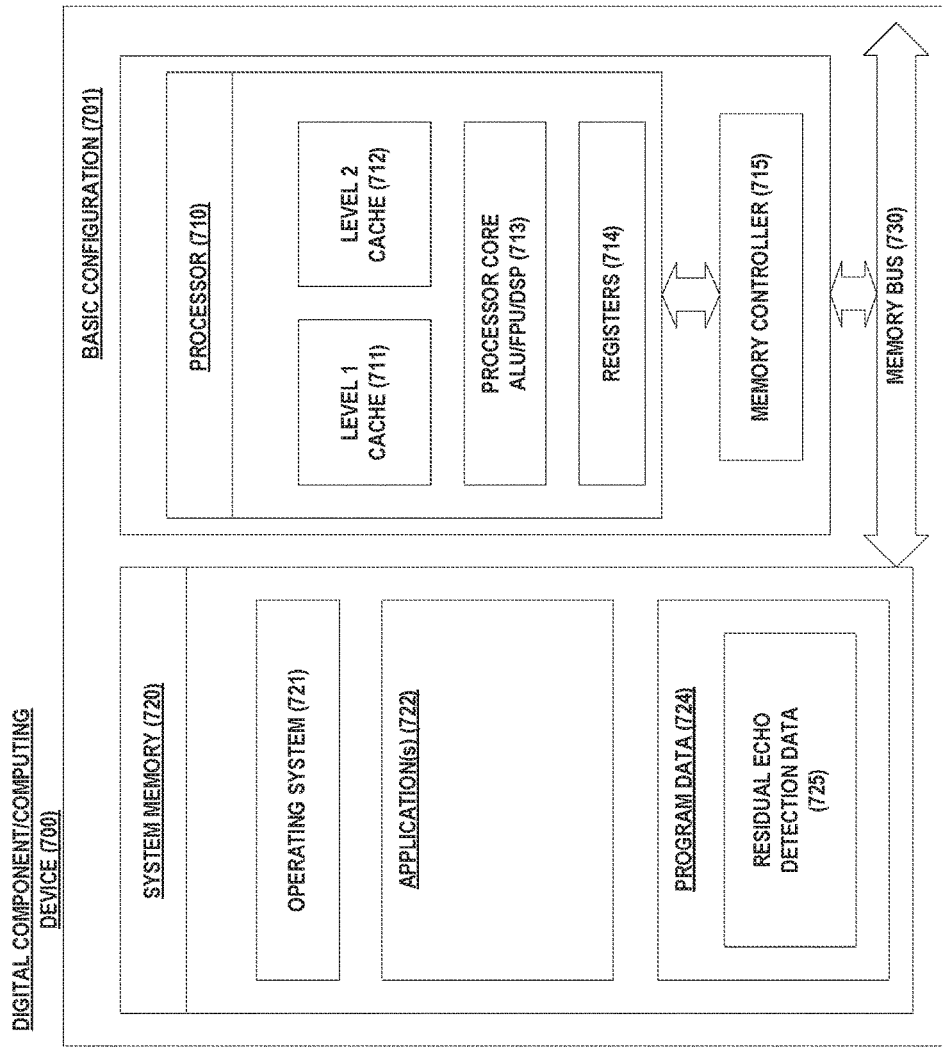
FIG. 9 is a block diagram illustrating an example computing device that implements the digital components according to one or more embodiments described herein.

FIG. 9 is a high-level block diagram of an exemplary device (700) that includes the random number generator according to one or more embodiments described herein. The device 700 may for example be a microcontroller, such as a security microcontroller providing security, encryption, and cryptography protocols to a connected computer or communication device using the random number generated, or a computer or communication device including embedded security including the random number generator and using the random number generated. In accordance with at least one embodiment, digital component/computing device (700) that may be configured to perform various functions supporting the hardened random number generator analog component 105/106 and may include the PRBS 210, FSM 400, truncator 200, post processor 300, buffer 250, analyzer 260, post processor components (control register 305, bit obfusctor 310, attack detection module 320, entropy enhancer, and bit churner), counter 380, timer 382, and logic circuit 385 as further explained above and in reference to FIGS. 4, 5A, 6, 7 and 8.

In a very basic configuration (701), the computing device (700) typically includes one or more processors (710) and system memory (720). A memory bus (730) can be used for communicating between the processor (710) and the system memory (720).

Depending on the desired configuration, the processor (710) can be of any type including but not limited to a microprocessor (µP), a microcontroller (µC), a digital signal processor (DSP), or any combination thereof. The processor (710) can include one more levels of caching, such as a level one cache (711) and a level two cache (712), a processor core (713), and registers (714). The processor core (713) can include an arithmetic logic unit (ALU), a floating point unit (FPU), a digital signal processing core (DSP Core), or any combination thereof. A memory controller (715) can also be used with the processor (710), or in some implementations the memory controller (715) can be an internal part of the processor (710).

Depending on the desired configuration, the system memory (720) can be of any type including but not limited to volatile memory (such as RAM), non-volatile memory (such as ROM, flash memory, etc.) or any combination thereof. System memory (720) typically includes an operating system (721), one or more application(s) (722), and program data (724). The application(s) (722) may include software implementations of the various components of the digital component 107 for supporting the hardened random number generator in accordance with one or more embodiments described herein. Program Data (724) may include storing instructions that, when executed by the one or more processing devices, implement a method(s) for performing the various functions of the digital component 107 as described in detail above. In some embodiments, the application(s) (722) can be arranged to operate with program data (724) on an operating system (721).

The computing device (700) can have additional features or functionality, and additional interfaces to facilitate communications between the basic configuration (701) and any required devices and interfaces.

System memory (720) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of the device (700).

The computing device (700) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (700) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In accordance with at least one embodiment, several portions of the subject matter described herein may be implemented via one or more ASICs, Field Programmable Gate Arrays (FPGAs), digital signal processors (DSPs), or other integrated formats. However, those skilled in the art will recognize that some aspects of the embodiments disclosed herein, in whole or in part, can be equivalently implemented in one or more integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory computer-readable medium used. Examples of a non-transitory computer-readable medium include, but are not limited to, the following: a recordable type medium such as a flash drive, a hard disk drive, a Compact Disc (CD), a Digital Video Disk (DVD), a digital tape, and a computer memory, etc.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The systems and methods discussed herein do not require collection or usage of user personal information. In situations in which certain implementations may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

The invention claimed is:

1. A random-number generator apparatus comprising:
   an analog circuit including a ring oscillator configured to collapse from an unstable oscillation state to a stable oscillation state at a random collapse time;
   a counter counting a counter value representing the random collapse time;
   a latch storing the counter value; and
   a truncator generating a random number based on a truncation of the stored counter value, wherein a length of the truncation is a random variation based on a pseudo-random value received by the truncator.

2. The random-number generator apparatus of claim 1, further comprising a pseudo-random number generator that provides the pseudo-random value.

3. The random-number generator apparatus of claim 1, further comprising:
   a dedicated voltage regulator providing dedicated power to the ring oscillator; and
   a power supply providing electrical power to parts of the random-number generator other than the ring oscillator.

4. The random-number generator apparatus of claim 3, wherein the dedicated voltage regulator is a low dropout regulator.

5. The random-number generator apparatus of claim 1, wherein said counter is a Gray code counter.

6. The random-number generator apparatus of claim 1, the ring oscillator including a main ring oscillator and a reference ring oscillator.

7. The random-number generator apparatus of claim 6, the random-number generator apparatus further comprising:
   a phase frequency detector comparing phases of the reference ring oscillator against the main ring oscillator to detect a collapse event of the main ring oscillator; and
   wherein the latch captures the counter value based on the detection of the collapse event by the phase frequency detector.

8. The random-number generator apparatus of claim 6, further comprising:
   a dedicated voltage regulator providing dedicated power to the main ring oscillator and the reference ring oscillator; and
   a power supply providing electrical power to parts of the random-number generator other than the main ring oscillator and the reference ring oscillator.

9. The random-number generator apparatus of claim 6, further comprising:
   an attack detection module XORing outputs of the main ring oscillator and the reference ring oscillator; and
   an analyzer detecting frequency locking of the main ring oscillator and the reference ring oscillator based on a predictable XOR output of the attack detection module.

10. The random-number generator apparatus of claim 1, further comprising:
    a control register having bit locations or values each associated with one of several post processing methods; and
    a post processor having a plurality of post processing methods each enabled according to the associated bit location or value in the control register.

11. The random-number generator apparatus of claim 1, further comprising:
    a buffer storing random numbers including at least a first random number; and
    a bit churner XORing a newly received random number with a stored random number and storing a result in the buffer.

12. The random-number generator apparatus of claim 1, further comprising:
    a set of parallel dummy inverter chains enabled before or after collapse of the ring oscillator.

13. The random-number generator apparatus of claim 1, further comprising:
    an attack detection module connected to one or more detectors and determining if the random-number generator apparatus is under attack, said attack detection module forcing the random-number generator apparatus into an idle state depending upon the attack.

14. A device comprising:
- a main ring oscillator configured to collapse from an unstable oscillation state to a stable oscillation state at a random collapse time;
- a reference ring oscillator configured to oscillate at a reference oscillation frequency;
- a counter counting oscillations of the reference ring oscillator to derive a counter value, wherein the counter value represents the random collapse time of the main ring oscillator;
- a pseudo-random number generator outputting a pseudo-random value; and
- a truncator generating a random number based on a truncation of the counter value, wherein a length of the truncation is a random variation based on the pseudo-random value.

15. The device of claim 14, further comprising:
- a dedicated voltage regulator providing dedicated power to the main ring oscillator and the reference ring oscillator; and
- a power supply providing electrical power to parts of the random-number generator other than the main ring oscillator and the reference ring oscillator.

16. The device of claim 15, wherein the dedicated voltage regulator is a low-dropout regulator.

17. The device of claim 14, further comprising:
- a phase frequency detector comparing phases of the reference ring oscillator against the main ring oscillator to detect a collapse event of the main ring oscillator; and
- a latch capturing the counter value based on the detection of the collapse event by the phase frequency detector.

18. The device of claim 14, wherein the device is included in a security microcontroller providing one or more of security, encryption, and cryptography protocols to a connected computer or communication device.

19. The device of claim 14, further comprising a temperature detector or a power-supply glitch detector that disables the device in the event of an attack.

20. The device of claim 14, wherein the pseudo-random number generator includes a linear feedback shift register.

* * * * *